July 24, 1951 — P. B. HULTKRANS — 2,562,146
ART OF RADIANT HEAT SEALING
Filed July 15, 1949
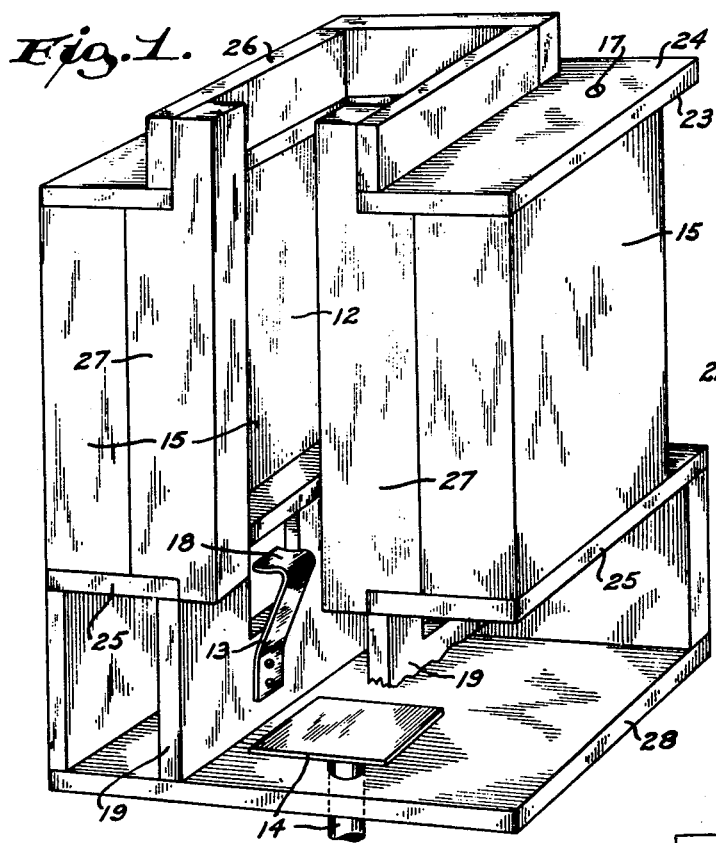
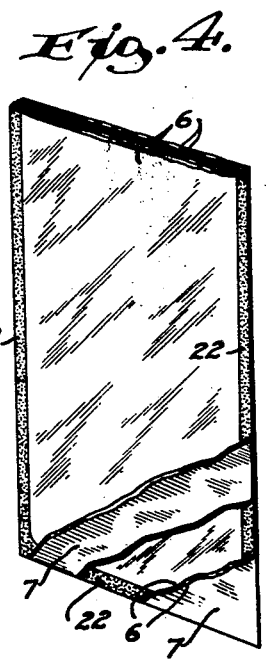
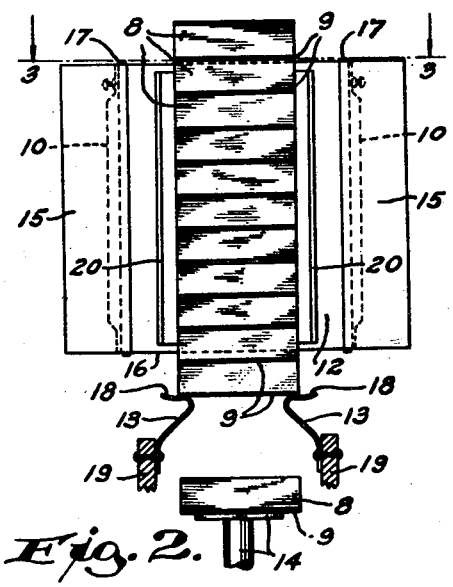
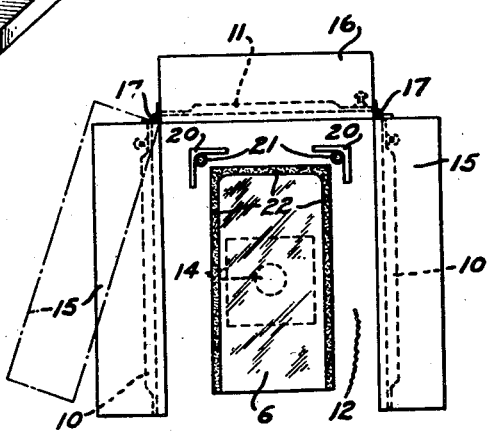
INVENTOR.
P. B. Hultkrans
BY Lieber & Lieber
ATTORNEYS.

Patented July 24, 1951

2,562,146

UNITED STATES PATENT OFFICE 2,562,146

ART OF RADIANT HEAT SEALING

Paul B. Hultkrans, Milwaukee, Wis., assignor to Milprint, Inc., Milwaukee, Wis., a corporation of Delaware Application July 15, 1949, Serial No. 104,996

4 Claims. (Cl. 154—42)

1

The present invention relates generally to the art of fabricating containers or the like from sheets of heat-sealable materials, and relates more particularly to the construction and operation of an improved radiant heat sealing device and to a method of joining the edges of sheets by heat radiation.

A primary object of this invention is to provide an improved device for forming containers or the like which is extremely simple and compact in construction and highly efficient in operation; and an improved method of producing such articles in large quantities in an exceedingly expeditious and economical manner.

It has heretofore been common commercial practice to manufacture bags, pouches or like containers of heat sealable materials, such as "Pliofilm," by severing ribbons or sheets of such material into desired lengths and thereafter applying heat or heat and pressure directly to the edge portions of superimposed sheets or stacks to seal such edges and thereby form the bag-like container. The heat sealing operations in the prior bag making processes have heretofore been accomplished in several ways: One of which is by the direct application of heat and pressure to the edges of adjacent pairs of coacting sheets as by means of heated bars, thereby producing one container at a time; and another of which is by stacking a relatively large number of the sheets in superimposed relation with spacer sheets of non-heat-sealable material interposed between each pair of coacting heat sealable sheets, and thereafter applying a hot plate or open flame first directly against the aligned edges of one side of the stack, and subsequently repeating the direct application of such hot plate to the edges at one end of the stack and to the edges of the opposite side of the stack by successive separate steps, to thereby complete a batch of containers. However, both of these prior methods of heat sealing have proven objectionable for diverse reasons: The first-mentioned method of producing individual units being slow and expensive and not particularly adaptable for quantity production; and the later method of bulk production oftentimes resulting either in inferior and unsightly seals wherein the edges are burned or scorched due to the direct contact with the heating element and overexposure thereto, or in inferior and inadequate seals resulting from lack of contact with the heating element due to inaccurate cutting of the sheets or uneven stacking thereof or underexposure to the heating element. In addition, the bulk sealing methods heretofore in commercial use were not adaptable to a continuous process since the edges along each side and end of each stack were sealed one at a time, thereby resulting, at most, in a truly batch process.

2

It is therefore a more specific object of my present invention to provide improvements in the art of heat sealing wherein the seals are effected by heat radiation and wherein all of the disadvantages heretofore attendant in prior commercial methods and apparatus are obviated.

Another specific object of my invention is to provide an improved apparatus for and method of continuously and automatically producing large quantities of containers in rapid succession and at relatively low cost.

Still another object of this invention is to provide an improved apparatus for and method of forming sealed containers all having perfect side and end seals of a uniform depth and wherein the corners are sealed to a predetermined greater depth than the adjacent edges.

Another specific object of the present invention is to provide an improved radiant heat sealing device which may be readily adjusted and adapted for effectively forming containers of diverse shapes and wherein the degree of penetration of the seal may be varied at will.

A further specific object of the present invention is to provide an improved apparatus for and method of continuously producing side and end seals of uniform depth in containers of heat sealable material without danger of burning or scorching the material regardless of possible variations in the uniformity of the sheets being treated.

Still another specific object of the present invention is to provide an improved method of forming containers from sheets of heat sealable materials, which comprises, stacking a plurality of the sheets in pairs with a sheet of non-heat sealable material between each pair, and thereafter heat sealing the edges thereof by exposing the edges to radiant heat.

An additional specific object of the present invention is to provide an improved radiant heat sealing device comprising, heating means providing a heating zone open on at least one side, and means for supporting a stack of superimposed sheets of heat sealable material with the edges thereof to be sealed in close proximity to but spaced from said heating means.

These and other more specific objects and advantages of the invention will become apparent from the following detailed description.

A clear conception of the several features of my improved apparatus, and of the several steps involved in the improved method of producing containers by my present method of radiant heat sealing, may be had by referring to the drawings accompanying and forming a part of this specification, wherein like reference characters designate the same or similar parts in the various views.

Fig. 1 is a perspective view of a typical improved radiant heat sealing device embodying the invention with parts broken away to reveal normally concealed structure;

Fig. 2 is a more or less diagrammatic fragmentary front view of the radiant heat sealing apparatus showing a stack of heat sealable sheets therein;

Fig. 3 is a section through the apparatus taken along the line 3—3 of Fig. 2; and Fig. 4 is a somewhat distorted perspective view of two successive bags produced by the apparatus in accordance with the present method, showing a spacing or slip sheet interposed between the two bags and with portions being broken away to more clearly show the superimposed sheets.

While the improvements have been described herein as being particularly advantageously applicable in the production of a certain type of container, commonly referred to as a fin type side seal bag, formed of a particular type of heat sealable material, it is not my desire or intent to thereby unnecessarily limit the invention by virtue of such restricted embodiment, since diverse other types of containers or articles of different suitable materials may also be produced in accordance with the invention.

In accordance with my improved method of producing bag-like containers, sheets of suitable heat sealable material of the desired size and shape are first formed by preferably severing a continuous ribbon or web of the material into successive uniform sections of the desired length; and as hereinabove indicated, a material which has been found especially adaptable is a rubber hydrochloride product known as "Pliofilm." Likewise, a supply of sheets of non-heat sealable material of substantially the same size and shape may be produced in like manner; and a plurality of the sheets are then stacked in superimposed relation, with a sheet of the non-heat sealable material interposed between each coacting pair of adjacent sheets of heat sealable material. Thereafter, the desired edges of the successive superimposed coacting pairs of heat sealable sheets are joined by exposing the same to radiant heat; and this heat sealing operation may be readily accomplished by progressively intermittently moving the stack of sheets through a heated space or zone with the edges to be sealed in close proximity to but spaced from heating elements furnishing the source of heat. The improved process may be continuous and automatic with the rate of movement of the stacked sheets through the heating zone, as well as the temperature of the heating means, being regulated in a suitable manner; and to avoid overheating at the sealed corners of the sheets, a convenient means of controlling the heat applied to such zone may be utilized, thereby resulting in the rapid production of effectively sealed bag-like containers by radiant heat sealing.

In the commercial exploitation of my improved method of producing bag-like containers, I prefer to utilize an installation substantially as shown in the accompanying drawing, since the typical apparatus illustrated therein has proven extremely efficient in the rapid and automatic production of large quantities of effectively sealed bags. Referring to the drawing, the sheets 6 of heat sealable material and the sheets 7 of non-heat sealable material may be produced and cut to the desired uniform size and shape with the aid of well known and commercially available equipment; and a plurality of the sheets thus produced may then be stacked, in any suitable and convenient manner, in batches 8 with a sheet 7 of non-heat sealable material interposed between successive superimposed pairs of the sheets 6 of heat sealable material to thereby space the successive pairs of sheets 6 from each other, each batch 8 of the stacked sheets 6, 7 being preferably positioned upon a relatively stiff supporting sheet 9 of suitable material to aid in the handling of the batches 8 and to maintain the sheets 6, 7 in flat condition. The bag producing apparatus shown in the drawing as embodying my invention comprises, in general, heating means such as a pair of opposed heating elements 10 and an end heating element 11 providing a heating zone 12 open on at least one side; supporting means including a pair of cooperating springs 13 or the like for retaining or supporting a suitable number of superimposed batches 8 of stacked sheets 6, 7 within the heating zone 12 with the edges of the sheets 6 to be sealed disposed in closed proximity to but spaced from the heating elements 10, 11 and with the edges of the sheets 6 to be left unsealed exposed to the open side of the zone 12; and means such as a vertically reciprocable plunger 14 operated by any suitable known source such as an air jack or hydraulic cylinder, not shown, for automatically lifting successive batches 8 of the stacked sheets 6, 7 into position on the supporting members 13, thereby progressively intermittently moving the batches of stacked sheets through the heated space.

The heating means is herein shown and described as consisting of a plurality of vertical electrically heated plates 10, 11 angularly disposed with respect to each other to provide a U-shaped heating zone with the plates or grids 10, 11 being confined within heat insulated casings 15, 16 respectively, but these heating elements may be of any suitable type such as coils or an open flame; and to permit convenient adjustment in the shape of the heating zone and in the relative angle of the heating plates or elements, as illustrated by dot-and-dash lines in Fig. 3, the heating elements 10, 11 may be hingedly connected to each other as shown at 17. The supporting springs 13 are preferably each formed with an upper flange or shoulder 18 connected in a convenient manner to a fixed support 19 by intermediate resilient arms adapted to be forced apart by the successive batches 8 of stacked sheets as they are raised by the plunger 14, the stiff supporting sheet 9 of each batch 8 being adapted to seat and be supported on the shoulders 18 of the springs upon downward withdrawal of the plunger 14. To prevent overheating and improper sealing at the corners of the sheets 6 due to pocketing of heat at these localities within the heating zone 12, a heat control baffle 20 and air or water cooling tubes 21 or like heat control means may be interposed between the corners of the stacked batches 8 of the sheets and the adjacent corners of the heating elements 10, 11; and as the stack of sheets 6, 7 is progressively moved through the heating zone 12 from the bottom thereof to the top at a predetermined rate of speed dependent upon the temperature within the zone 12 and the depth of seal desired, the adjacent coacting sheets 6 of heat sealable material are effectively sealed along the edges as shown at 22 by heat radiating from the elements 10, 11 within the heating zone 12, with a somewhat deeper seal being effected at the corners of the sheets 6 dependent upon the amount of baffling or heat control at these localities of normally increased temperature. To complete the unitary structure and to provide a heat-insulated outer casing or housing 23 and to further provide convenient supporting means for the several parts, upper and lower supporting plates 24, 25, respectively, interconnected by sturdy upright columns 27 coacting to support a chimney or stack 26 may be provided, as shown in Fig. 1; and the entire unit may be conveniently supported on a base 28 or the like.

From the foregoing detailed description, it will be apparent that the present invention provides an improved apparatus for the production of heat sealed bag-like containers which may be effectively utilized in producing such containers in an efficient manner in accordance with my improved method. By utilizing the improved apparatus and method in the manufacture of heat sealed articles, the speed or rate of production may be enhanced to a maximum and the articles may be rapidly and efficiently produced at minimum cost. As indicated herein, the apparatus shown and described is a typical embodiment of my invention and may obviously be readily modified and may be easily adjusted to produce improved bag-like containers of heat sealable material in various shapes and sizes. The piston or plunger 14 for feeding batches 8 of stacked sheets 6, 7 to the heating zone 12 may be actuated automatically in any convenient manner as by an air or hydraulic cylinder and the springs 13 for supporting stacked batches of the sheets 6, 7 may obviously be modified in accordance with the needs or requirements of the installation. The plungers 14 may also be regulated to vary the speed or rate of movement of the stacked batches through the oven or heating zone and the temperature of the heating plates or grids may also be adjusted in any well-known manner so as to effect the desired depth of seal with the heat at the corners of the stacked sheets 6, 7 being controlled by the provision of the heat baffles 20 and tubes 21 through which cooling water or air may be passed dependent upon the desired degree of sealing at the corners of the sheets. In effecting production of the bags in accordance with the improved method, the sizes of the batches 8 may be varied in accordance with requirements and as required for ease in handling and the spacer sheets 7 of non-heat sealable material may be relatively thin and function to prevent successive pairs of sheets 6 from sticking together or sealing to each other. The sheets 7 should not be confused with the supporting sheets or plates 9 which are of rigid stock and are utilized merely to support batches of the stacked sheets in substantially flat condition while these batches are progressively moved through the heating zone. As hereinabove indicated, the heating elements 10, 11 may be of any suitable type and instead of separate heating elements angularly disposed relative to each other, one continuous element of substantially U-shape may be utilized.

The invention has in fact enjoyed considerable commercial success during extensive use thereof in the production of flat so-called fin type side-seal bags of transparent "Pliofilm" and these commercial bags produced by the present apparatus and in accordance with my improved method have proven extremely satisfactory for the purpose of packing and merchandising diverse commodities and maintaining the same in fresh and wholesome condition due to the extremely effective resultant seals.

It should be understood that it is not desired or intended to limit this invention to the exact steps of the production method or to the precise details of construction of the apparatus herein shown and described for various modifications within the scope of the appended claims may occur to persons skilled in the art to which this invention pertains and it is also contemplated that specific descriptive terms used herein be given the broadest possible interpretation consistent with the disclosure.

I claim:

1. The method of forming polygonal flat bags from sheets of heat sealable material, which comprises, stacking the sheets upon each other in pairs with a sheet of non-heat sealable material between successive pairs, and thereafter simultaneously heat sealing all but one edge of each pair of said sheets by advancing the stack through a heating zone having the source of heat spaced from said edges.

2. The method of forming polygonal flat bags from sheets of heat sealable material, which comprises, stacking the sheets upon each other in pairs with a sheet of non-heat sealable material of the same shape and size between successive pairs, and thereafter simultaneously heat sealing all but one edge of each pair of said sheets by advancing the stack through a heating zone having the source of heat spaced from said edges.

3. Apparatus for forming polygonal flat bags from sheets of heat sealable material comprising, means forming a heating zone defined by a plurality of upright heating elements angularly disposed relative to each other to substantially correspond with the polygonal shape of the sheets to be sealed, said heating zone being open along one side thereof, means for supporting a stack of the heat sealable sheets, and means for advancing the same through said heating zone with the edges to be sealed in close proximity to but spaced from said heating elements and with the edges to be left unsealed exposed to said side opening.

4. Apparatus for forming polygonal flat bags from sheets of heat sealable material comprising, means forming a heating zone defined by a plurality of upright heating elements angularly disposed relative to each other to substantially correspond with the polygonal shape of the sheets to be sealed, said heating zone being open along one side thereof, means for supporting a stack of the heat sealable sheets, means for advancing the same through said heating zone with the edges to be sealed in close proximity to but spaced from said heating elements and with the edges to be left unsealed exposed to said side opening, and means within said heating zone for reducing the heat radiating from the corners thereof.

PAUL B. HULTKRANS.

REFERENCES CITED

The following references are of record in the file of this patent:

UNITED STATES PATENTS

| Number | Name | Date |
| --- | --- | --- |
| 2,057,776 | Groven | Oct. 20, 1936 |
| 2,224,017 | Gurwick | Dec. 3, 1940 |
| 2,232,062 | Gurwick | Feb. 18, 1941 |
| 2,259,239 | Brown | Oct. 14, 1941 |
| 2,358,455 | Hallman | Sept. 19, 1944 |
| 2,368,645 | De Sylva | Feb. 6, 1945 |
| 2,458,184 | Marick | Jan. 4, 1949 |
| 2,472,293 | Groven | June 7, 1949 |